United States Patent
Vanderpool et al.

(10) Patent No.: US 9,721,127 B2
(45) Date of Patent: Aug. 1, 2017

(54) SYSTEMS AND METHODS FOR CONTROLLING ACTIVATION OF OPTIONS PRELOADED ON A MATERIAL HANDLING VEHICLE

(71) Applicants: Joshua Daniel Vanderpool, Windsor, NY (US); Timothy Edward Donahue, Binghamton, NY (US)

(72) Inventors: Joshua Daniel Vanderpool, Windsor, NY (US); Timothy Edward Donahue, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 88 days.

(21) Appl. No.: 14/202,904

(22) Filed: Mar. 10, 2014

(65) Prior Publication Data
US 2015/0254480 A1    Sep. 10, 2015

(51) Int. Cl.
*H04Q 5/22* (2006.01)
*G06K 7/10* (2006.01)
*B66F 9/24* (2006.01)
*B62B 5/00* (2006.01)
*B62B 3/06* (2006.01)

(52) U.S. Cl.
CPC ............ *G06K 7/10297* (2013.01); *B66F 9/24* (2013.01); *G06K 7/10376* (2013.01); *B62B 3/0612* (2013.01); *B62B 5/0069* (2013.01)

(58) Field of Classification Search
None
See application file for complete search history.

(56) References Cited

U.S. PATENT DOCUMENTS

| | | |
|---|---|---|
| 7,163,153 B2 | 1/2007 | Blossom |
| 7,712,675 B2 | 5/2010 | Balinsky et al. |
| 7,946,483 B2 | 5/2011 | Miller et al. |
| 8,393,545 B1 | 3/2013 | Mullen et al. |
| 8,423,203 B2 | 4/2013 | Takeuchi et al. |
| 2008/0120509 A1 | 5/2008 | Simon |
| 2008/0230615 A1 | 9/2008 | Read et al. |
| 2011/0128118 A1* | 6/2011 | Gilleland ....... G06Q 10/063114 340/5.2 |
| 2012/0019379 A1* | 1/2012 | Ben Ayed .......... G08B 13/1436 340/539.1 |

(Continued)

FOREIGN PATENT DOCUMENTS

JP    2006188353 A    7/2006
WO    2008074008 A2    6/2008

OTHER PUBLICATIONS

Extended European Search Report; Appln. No. 15158439.8; dated Aug. 12, 2015; 8 pages.

(Continued)

*Primary Examiner* — Brian Zimmerman
*Assistant Examiner* — Thomas McCormack
(74) *Attorney, Agent, or Firm* — Quarles & Brady LLP

(57) ABSTRACT

Systems and methods for a material handling vehicle include a controller and a near field communication reader adapted to communicate with the controller. The controller is configured to activate at least one of a software option and a hardware option when a near field communication device encoded with option information is placed within an operable range to the near field communication reader.

23 Claims, 5 Drawing Sheets

(56) References Cited

U.S. PATENT DOCUMENTS

2013/0338874 A1  12/2013  Donahue

OTHER PUBLICATIONS

Vinicius Rodrigues Arduino Leonardo RFID Windows Login/Logout; youtube screen shot; Published on Sep. 14, 2013; 1 page.
Rohos Blog Archive; Data Security and User Authentication for PC and Mac, Windows login with secure RFID token Wireless PC Lock; dated Nov. 27, 2015; 5 pages.

* cited by examiner

SYSTEMS AND METHODS FOR CONTROLLING ACTIVATION OF OPTIONS PRELOADED ON A MATERIAL HANDLING VEHICLE

CROSS-REFERENCE TO RELATED APPLICATIONS

Not applicable.

STATEMENT CONCERNING FEDERALLY SPONSORED RESEARCH OR DEVELOPMENT

Not applicable.

FIELD OF THE INVENTION

The present invention relates to the field of material handling vehicles, and more specifically to systems and methods for controlling activation of options preloaded on a material handling vehicle.

BACKGROUND OF THE INVENTION

Material handling vehicles are used to move items inside a factory, a warehouse, a freight transfer station, a store, or other type of facilities. Material handling vehicles are designed in a variety of configurations to perform a variety of tasks. As with most modern industrial equipment, there are many different options available to the purchaser or operator of the material handling vehicle depending on the configuration or task required. Some of the options may require installation by the manufacturer of the material handling vehicle at the time of manufacture. Other options may be installed by a dealer or could be installed in the form of an upgrade at a customer site. Some options may require only software controlling the material handling vehicle to be reconfigured or modified.

As the sophistication of material handling vehicles has increased, software and programming of various types of controllers has become an increasingly important aspect of customization. Traditionally, a technician equipped with a computer is required to connect the computer to a material handling vehicle control system to configure any of the software components required for activation of specific options. The technician could do this at a dealership or at a customer location.

There are several drawbacks to the traditional method of activating options on material handling vehicles, or industrial equipment in general. Requiring a technician to connect a computer to the material handling vehicle to activate options at a dealership or customer location is expensive and takes time and effort to coordinate. Further, traditional option activation processes limit manufacturers with the options that can be physically built into a specific vehicle. The same limitations impact the upgradeability of material handling vehicles already sold and deployed to customer locations.

What is needed is a material handling vehicle configured to allow controllable activation of options.

SUMMARY OF THE INVENTION

Embodiments of the present invention overcome the aforementioned drawbacks by providing systems and methods for activating and/or deactivating options preloaded and/or loadable on a material handling vehicle utilizing wireless technology. The systems and methods disclosed herein also provide greater flexibility to manufactures to provide a wide variety of user activated options and upgradeable features.

In one aspect, the present invention provides systems and methods for a material handling vehicle including a frame, and a vertically movable platform mounted relative to the frame, the platform being vertically movable between an upper position and a lower position. The material handling vehicle further including a controller and a near field communication reader adapted to communicate with the controller. Wherein the controller is configured to activate at least one vehicle option when an active or passive near field communication device encoded with option information is placed within an operable range to the near field communication reader.

In another aspect, the present invention provides a method for activating an option on a material handling vehicle that includes a controller and a near field communication reader. The method includes providing a near field communication device, wherein the near field communication device is encoded with option information for the material handling vehicle. The method also includes placing the near field communication device within an operable range to the near field communication reader and then reading the option information from the near field communication device by the near field communication reader. Finally, the method includes the controller activating at least one vehicle option based on reading the option information.

In yet another aspect, the present invention provides a vehicle system including a controller configured to activate at least one of a software option and a hardware option and a near field communication reader adapted to communicate with the controller. The active or passive near field communication device is encoded with option information. When the active or passive near field communication device is placed within an operable range to the near field communication reader, at least one of a software option and a hardware option is activated.

The foregoing and other objects and advantages of the invention will appear in the detailed description which follows. In the description, reference is made to the accompanying drawings which illustrate preferred embodiments.

Figure 1:
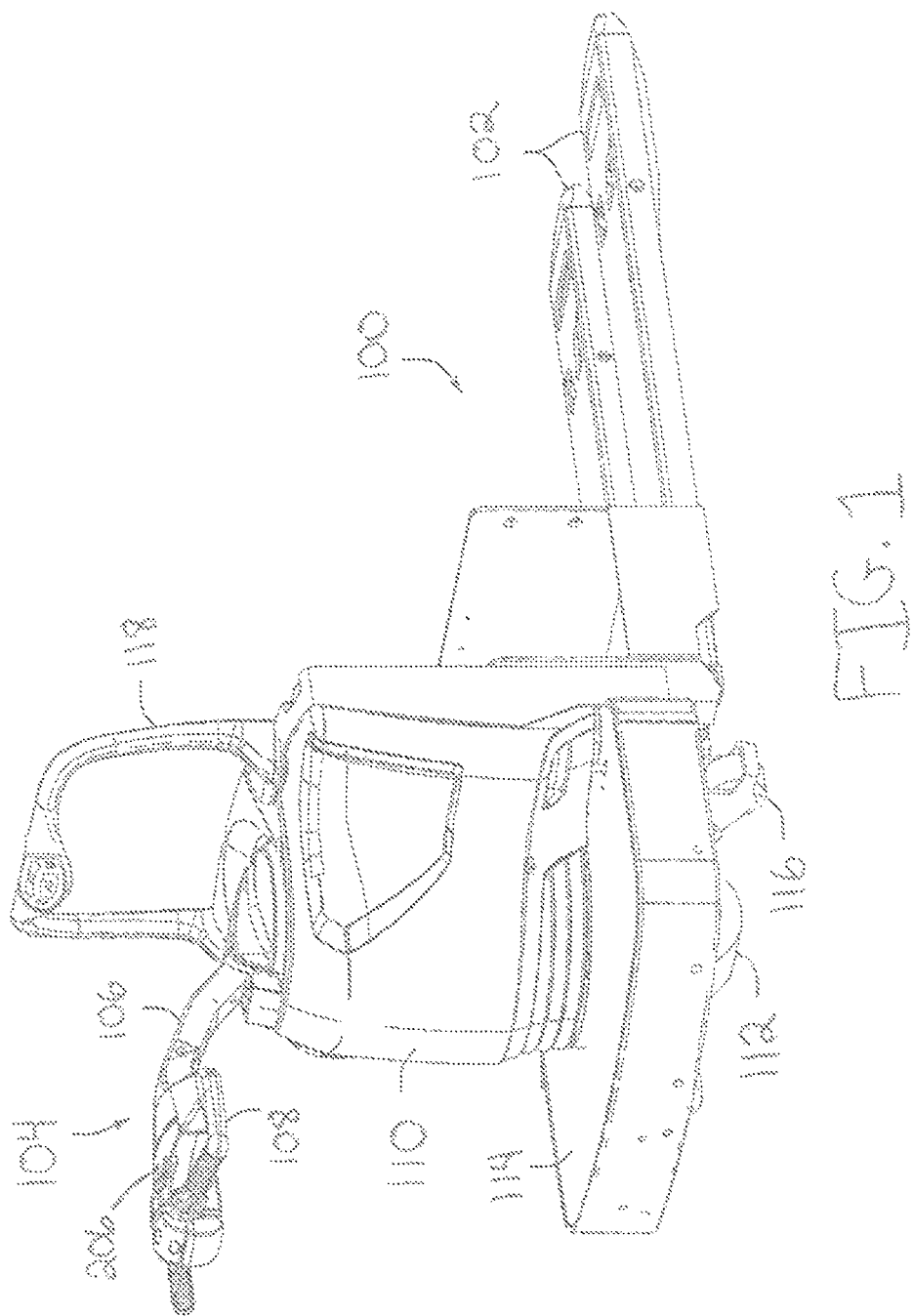
FIG. 1 is a perspective view of a material handling vehicle.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The invention will now be described more specifically with reference to the following embodiments. It is to be noted that the following embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "connected" and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically. Thus, although schematics shown in the figures depict example arrangements of processing elements, additional intervening elements, devices, features, or components may be present in an actual embodiment.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to implement aspects detailed herein.

As used herein, the term "controller" may include one or more processors and memories and/or one or more programmable hardware elements. As used herein, the term "controller" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which configuration data and programs may be stored and/or data communications may be buffered. The term "memory" may also include other types of known or future developed memory or combinations thereof.

The various aspects of the invention will be described in connection with controlling activation of options preloaded or loadable on a material handling vehicle. That is because the features and advantages that arise due to embodiments of the invention are well suited to this purpose. Still, it should be appreciated that the various aspects of the invention can be applied to other vehicles and to achieve other objectives as well.

It is to be appreciated that material handling vehicles are designed in a variety of configurations to perform a variety of tasks. Although the vehicle 100 is shown by way of example as a hand/rider truck, it will be apparent to those of skill in the art that the embodiments are not limited to vehicles of this type, and can also be provided with various other types of vehicle configurations, including for example, vans, semi trucks, pickup trucks, pallet trucks, stacker trucks, fore-aft stance operator lift trucks, reach trucks, high-lift trucks, counterbalanced trucks, and swing-reach trucks, as non-limiting examples. The systems and methods described herein are suitable for both driver controlled, pedestrian controlled and remotely controlled material handling vehicles.

Referring now to the Figures, and more particularly to FIG. 1, one embodiment of a material handling vehicle 100 that incorporates the present invention is shown. FIG. 1 depicts a hand/rider vehicle 100 having load bearing forks/platform 102 that may be vertically movable between an upper position and a lower position, and a steering control mechanism 104 that includes a movable steering arm 106 and steering arm handle 108. The vehicle 100 is also provided with a motor housing 110 and a steerable drive tire 112 located under a platform 114. The vehicle 100 is also shown with stabilizing casters 116, and a hand rail 118 that can be grasped by a riding operator standing on the platform 114. For the present invention a wireless reader 206 may be included in or on the vehicle 100. The wireless reader may be placed at various locations on the vehicle 100. For illustrative purposes, the reader 206 is shown as part of the steering control mechanism 104. It is contemplated that one having ordinary skill in the art could configure the vehicle 100 to have a wireless reader 206 in any advantageous or useful position.

Figure 2:
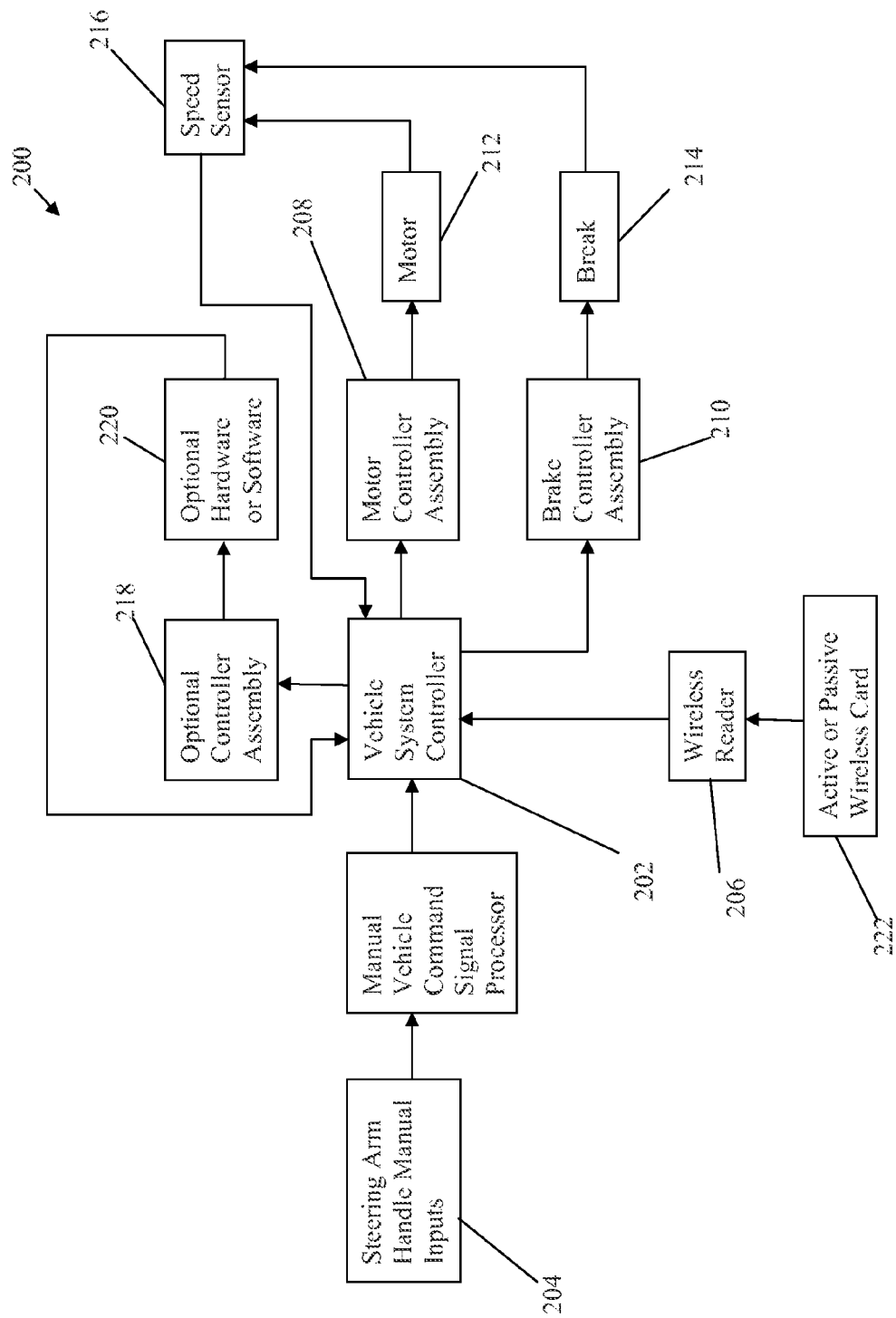
FIG. 2 is a block diagram for a material handling vehicle control system.

Now referring to FIG. 2, a block diagram for a vehicle control system 200 for the vehicle 100 is depicted. The system 200 can include a vehicle system controller 202 that may receive manual inputs 204 from the steering arm handle 108. The system controller 202 may also receive inputs from the wireless reader 206. The system controller 202 can produce output signals for controlling a motor control assembly 208 and a brake control assembly 210. The motor and brake control assemblies 208, 210 in turn controls a motor 212 and a brake 214. Both the motor 212 and the brake 214 may provide feedback to the system controller 202 through a speed sensor 216. The system controller 202 may also be configured to provide outputs for at least one of an optional controller assembly 218 that may not be activated. The system controller 202 and/or the optional controller assembly 218 may be configured to control optional hardware or software options 220 that may not be activated. Also shown is a wireless card or device 222 that can be encoded with option information to activate the optional hardware or software 220 in the system controller 202, and/or optional controller assembly 218.

All of the embodiments describe below may be capable of at least one of activating and deactivating at least one of various software and hardware options. Some examples of software and hardware options that a customer or user can activate or deactivate can include but are not limited to setting the maximum travel speed, acceleration rate, brake deceleration rate, and throttle responsiveness. Further examples may include power management, such as adjusting timeout delays for an idle vehicle. Configuring the information displayed to the user may be another example of an option to be controlled by the various embodiments described herein. It is contemplated that one having skill in the art may understand the various software and hardware options available to be activated or deactivate by the provided embodiments.

Figure 3:
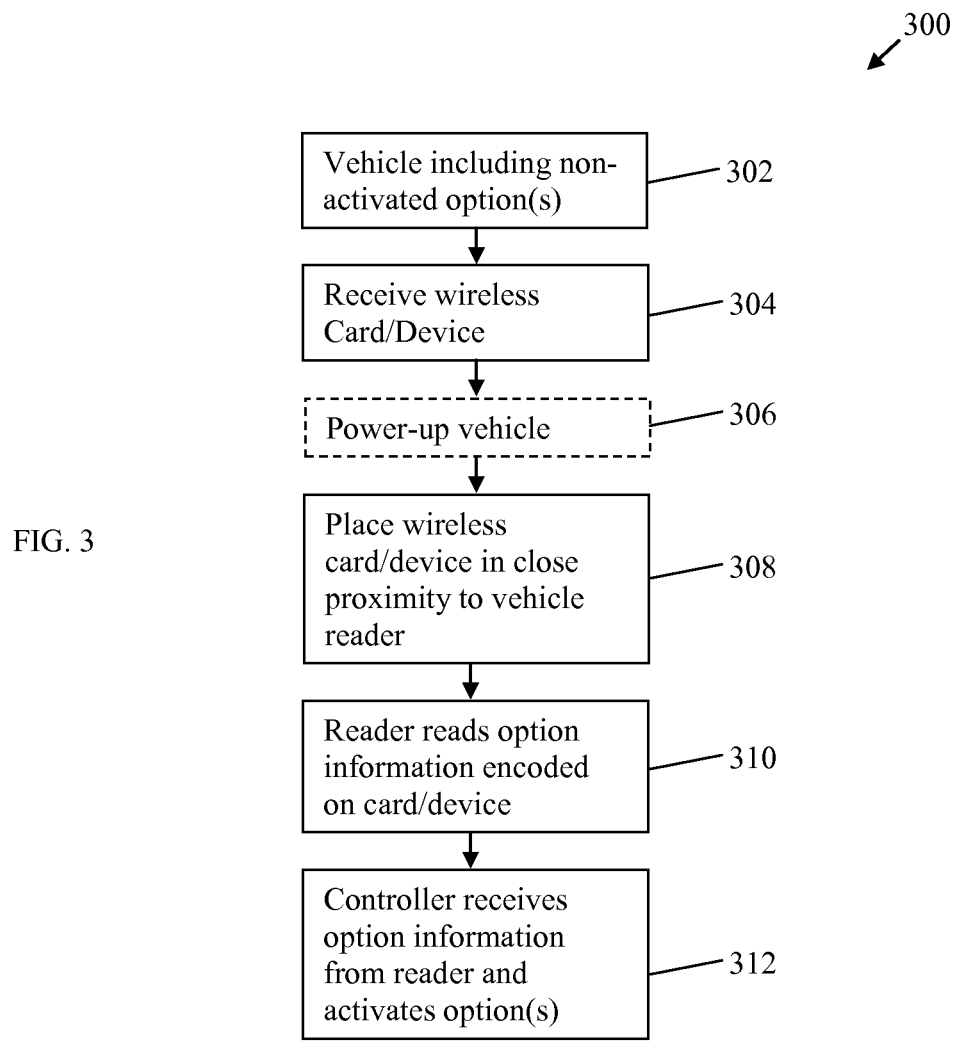
FIG. 3 is a flow chart depicting one embodiment of a process for activating an option on a material handling vehicle.

Now turning to FIG. 3, a flow chart of a first embodiment of the present invention is depicted. A process 300 is depicted for activating options 220 on the vehicle 100. It is contemplated that the vehicle 100 includes at least one option that is not activated. A first step 302 of the process 300 can be providing a vehicle that includes at least one option ready for activation. An option can be a purchased option that is only available upon purchase, and then activation, or an option can be provided as a standard option that is only available upon activation. A second step 304 can include a customer receives a wireless card or device 222 encoded with the non-activated option information. For a third step 306, the vehicle 100 may need to be powered up in preparation for activating the non-activated option 220, although not required. A fourth step 308 in the process 300 can be that the customer can place the wireless card or device 222 in close proximity to the wireless reader 206. A fifth step 310 can include the option information is read off the card or device 222 by the reader 206. A sixth step 312 can include the option being activated by the system controller 202 and/or optional controller assembly 218. After the process 300 is completed, the activated option can be available to be utilized on the vehicle 100 by the customer. It is to be appreciated that the customer may need to perform some other action to fully enable an activated feature, including a mechanical action or a software action, e.g., data entry.

It is contemplated that the wireless reader 206 and the wireless card or device 222 may be any variety of wireless systems know to those with skill in the art. One example envisioned is radio-frequency identification (RFID) technology. Specifically, near field communication (NFC) may be one of the possible technologies used in the present system and methods. It is further envisioned that the many different types of readers and cards or devices may be utilized in the present invention. One having skill in the art could employ the systems and methods described herein using combinations of active and passive readers and devices. It is further contemplated that any of the different types of active and passive sensors may be utilized for encoding the option information for the present invention. The encoded option information may include a simple activation code that the system controller recognizes to activate the option, or the information may include other software components and or updates.

It is further contemplated that the vehicle 100 in process 300 may be a brand new vehicle that is having options activated for the first time before deployment of said vehicle. Alternatively, the vehicle 100 may be a previously deployed vehicle to a customer that has included non-activated options. Further, the vehicle 100 may have hardware installed after being deployed to a customer location and then have options activated. Also, it is contemplated that the options to be activated may be software only options. For example, how the system controller 202 controls the performance of the motor 212 or the brake 214 may be different. Alternatively, hardware that may be preinstalled on the vehicle 100 that is not active to the system controller may be activated by the process 300. The option or options activated in process 300 are envisioned to be permanently activated.

Figure 4:
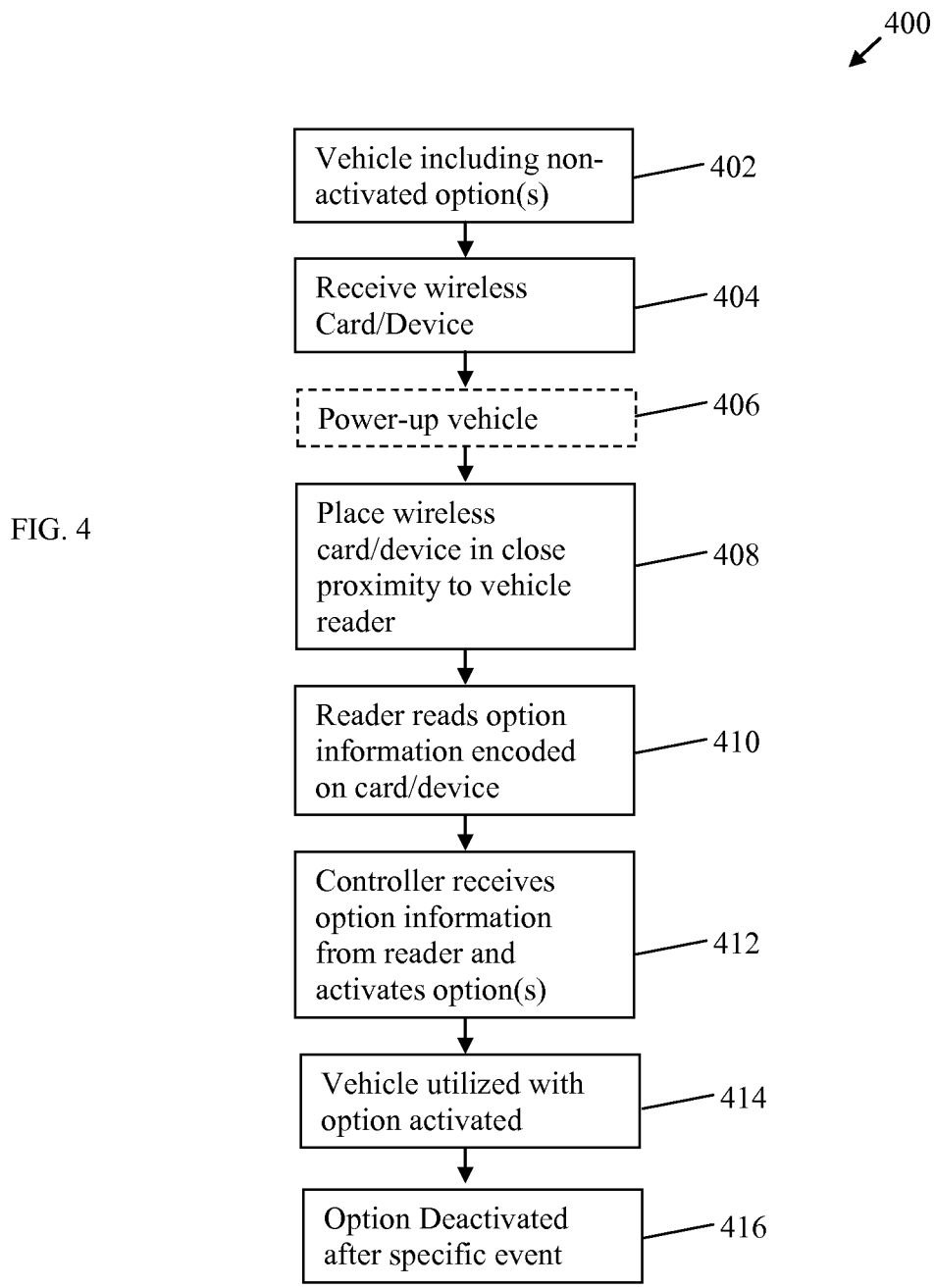
FIG. 4 is a flow chart depicting another embodiment of a process for activating an option on a material handling vehicle.

Now turning to FIG. 4, a flow chart of a second embodiment depicting a process 400 to activate an option or options 220 on a vehicle 100 is shown. The process 400 is similar to the process 300 except that the option activated may be activated temporarily. For example, a customer may want to try an option before purchasing the option. A first step 402 of the process 400 an be providing a vehicle that includes at least one option ready for activation. A second step 404 can include a customer receives a wireless card or device 222 encoded with the non-activated option information. Alternatively, a customer may posses a variety of wireless cards or devices 222 encoded with various option configurations. For a third step 406, the vehicle 100 may need to be powered up in preparation for activating the non-activated option 220, although not required. A fourth step 408 of the process 400 can be that the customer will place the wireless card or device 222 in close proximity to the wireless reader 206. A fifth step 410 can include the non-activated option 220 information is read off the card or device 222 by the reader 206. A sixth step 412 can include the option being activated by the system controller 202 and/or optional controller assembly 218. The process 400 can continue with a seventh step 414, the vehicle may be utilized with the activated option. An eighth step 416 can include deactivating the option. It is contemplated that deactivating the option could happen in multiple ways. One non-limiting example could be to have the user place the wireless card or device 222 in close proximity to the reader 206 again to deactivate the option. Another example may be associating the temporary option activation with a timer. It is envisioned that one having skill in the art may configure the deactivation of the option in any number of ways.

Figure 5:
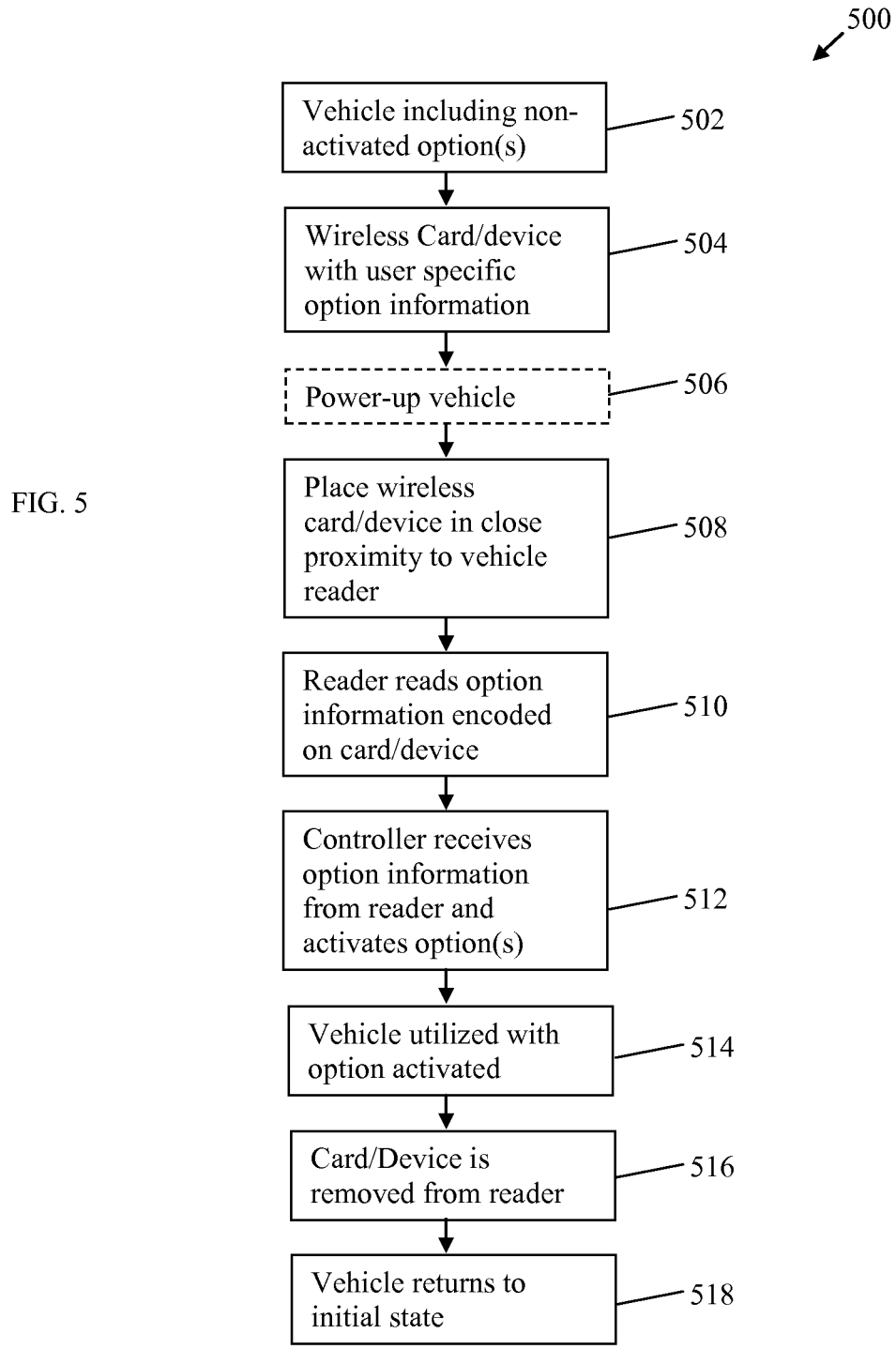
FIG. 5 is a flow chart depicting yet another embodiment of a process for activating an option on a material handling vehicle.

Now turning to FIG. 5, a flow chart of a third embodiment depicting a process 500 to activate an option or options 220 on a vehicle 100. The process 500 is similar to the processes 300 and 400 except that the option or options activated are user specific while the user is controlling the vehicle 100. In this embodiment, the wireless card or device 222 can be an employee's identification card or badge, for example. A first step 502 of the process 500 can be providing a vehicle that includes at least one option ready for activation. A second step 504 can include a user posses a wireless card or device 222 encoded with the non-activated option information that is specific to that user. One example may be limiting how fast a vehicle may move or how high a load may be lifted for a novice user. Alternatively, an advanced user may have the full range of capabilities activated with the options activated. For a third step 506, the vehicle 100 may need to be powered up in preparation for activating the non-activated option or options 220, although not required. A fourth step 508 of the process 500 can be that the customer can place the wireless card or device 222 in close proximity to the wireless reader 206. It is contemplated that the card or device 222 may be maintained in place in close proximity to the reader 206 during the time the user utilizes the vehicle 100. One having skill in the art would be able to design the location of the reader 206 and any number of means to maintain the card or device 222 in close proximity to said reader 206. A fifth step 510 can include the non-activated option or options 220 information is read off the card or device 222 by the reader 206. A sixth step 512 can include the option or options being activated by the system controller 202. The process 500 can continue with a seventh step 514, the vehicle may be utilized with the activated option or options 220. An eighth step 516 can include the user removing the card or device 222. A ninth step 518 can include the vehicle returning to a pre-option activated state or where the option has been disabled, with the vehicle ready for the next user.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

We claim:

1. A material handling vehicle comprising:
    a frame, and a vertically movable platform mounted relative to the frame, the platform being vertically movable between an upper position and a lower position, wherein the material handling vehicle includes a deactivated hardware item installed after being deployed to a customer location;
    a controller configured to activate the deactivated hardware item;
    a near field communication reader adapted to communicate with the controller; and
    the controller to activate the deactivated hardware item when an active or passive near field communication device encoded with information for the deactivated hardware item is placed within an operable range to the near field communication reader.

2. The material handling vehicle as set forth in claim 1 wherein the deactivated hardware item remains activated after the near field communication device is removed from the operable range of the near field communication reader.

3. The material handling vehicle as set forth in claim 1 wherein the activated hardware item is deactivated by the controller after the near field communication device is removed from the operable range of the near field communication reader.

4. The material handling vehicle as set forth in claim 1 wherein the active or passive near field communication device is also encoded with option information that is specific to a user.

5. The material handling vehicle as set forth in claim 4 wherein the near field communication reader retains the active or passive near field communication device while the user operates the material handling vehicle.

6. The material handling vehicle as set forth in claim 1 wherein the activated hardware item is deactivated by the controller after a specific amount of time has passed.

7. The material handling vehicle as set forth in claim 1 wherein the deactivated hardware item includes both hardware and software elements.

8. A method of activating a deactivated hardware item on a material handling vehicle, the material handling vehicle including a controller, a near field communication reader, and the deactivated hardware item installed after being deployed to a customer location, the method comprising:
    providing a near field communication device, the near field communication device being encoded with information for the deactivated hardware item on the material handling vehicle;
    reading the information for the deactivated hardware item from the near field communication device by the near field communication reader when the near field communication device is within an operable range to the near field communication reader; and
    the controller activating the deactivated hardware item on the material handling vehicle based on reading the information from the near field communication device.

9. The method as set forth in claim 8 wherein the activated hardware item remains activated after removal of the near field communication device.

10. The method as set forth in claim 8 further including the controller deactivating the the activated hardware item after removal of the near field communication device.

11. The method as set forth in claim 8 wherein the near field communication device is also encoded with option information that is specific to a user.

12. The method as set forth in claim 11 further including the near field communication reader retaining the near field communication device while the user operates the material handling vehicle.

13. The method as set forth in claim 8 further including the controller deactivating the activated hardware item after a specific amount of time has passed.

14. The method as set forth in claim 8 wherein removing the near field communication device from the operable range of the near field communication reader and then placing the near field communication device within the operable range of the near field communication reader deactivates the activated hardware item.

15. A vehicle system comprising:
    at least one deactivated hardware item installed after being deployed to a customer location;
    a controller to activate at least one deactivated hardware item for the vehicle;
    a near field communication reader to communicate with the controller; and
    a near field communication device encoded with information for the deactivated hardware item, and when the near field communication device is placed within an operable range to the near field communication reader, the at least one deactivated hardware item is activated by the controller on the vehicle.

16. The system as set forth in claim 15 wherein the at least one activated hardware item remains activated after the near field communication device is removed from the operable range of the near field communication reader.

17. The system as set forth in claim 15 wherein the at least one activated hardware item is deactivated by the controller after the near field communication device is removed from the operable range of the near field communication reader.

18. The system as set forth in claim 15 wherein the near field communication device is also encoded option information that is specific to a user.

19. The system as set forth in claim 18 wherein the near field communication reader retains the near field communication device while the user operates the vehicle.

20. The system as set forth in claim 15 wherein the at least one activated hardware item is deactivated by the controller after a specific amount of time has passed.

21. The system as set forth in claim 15 wherein removing the near field communication device from the operable range of the near field communication reader and then placing the near field communication device within the operable range to the near field communication reader deactivates the at least one activated hardware item.

22. The material handling vehicle as set forth in claim 1 wherein a previously preinstalled non-activated hardware item on the vehicle is activated by the activation of the deactivated hardware item.

23. The vehicle system as set forth in claim 15 wherein a previously preinstalled non-activated hardware item on the vehicle is activated by the activation of the deactivated hardware item.

* * * * *